United States Patent Office 3,574,193
Patented Apr. 6, 1971

3,574,193
PROCESS FOR THE PRODUCTION OF LACTAMS
Otto Immel, Krefeld-Uerdingen, and Hans-Helmut Schwarz, Krefeld, Germany, assignors to Farbenfabriken Bayer Aktiengesellschaft, Leverkusen, Germany
No Drawing. Filed Aug. 14, 1969, Ser. No. 850,223
Claims priority, application Germany, Aug. 24, 1968,
P 17 95 226.0
Int. Cl. C07d 41/06, 29/42
U.S. Cl. 260—239.3
1 Claim

ABSTRACT OF THE DISCLOSURE

Process for the production of lactams by catalytic rearrangement of cyclic ketoximes having 5–12 C-atoms in the ring in the gas phase, using as a catalyst a mixture of boron nitride and boric acid or boron nitride and boron trioxide.

---

This invention relates to a process for the production of lactams by the catalytic rearrangement of ketoximes in the gas phase.

It is already known that cyclic ketoximes can be rearranged in the gas phase on solid catalysts, to form the corresponding lactams at temperatures of from 200 to 400° C. The catalysts employed are acid catalysts, for example, phosphoric acid, alkali metal bisulphates or boric acid, on suitable supporting materials. Titanium dioxide, aluminum oxide and tin oxide, for example, have been proposed as supporting materials. Particular commercial interest has been shown in the catalyst containing boric acid. The activity and selectivity of a boric acid catalyst is governed by the type of supporting material used and by the quantity in which it is present in the catalyst mixture.

To obtain satisfactory yields, the rearrangement of ketoximes has heretofore preferably been carried out at reduced pressure in the presence of a little steam. Carrier gases, for example nitrogen or hydrogen, may also be used.

Carbonisation products are simultaneously deposited upon the catalyst containing boric acid during the rearrangement reaction, with the result that the catalyst loses its activity. Accordingly it has to be regenerated by burning off at intervals of several hours. After prolonged use, however, this method of regeneration is inadequate because the activity of the catalyst diminishes considerably and cannot be restored by burning off.

It is an object of this invention to provide a process for the production of lactams in the gas phase which does not have the disadvantages mentioned above.

This object is accomplished by a process for the production of lactams which comprises rearranging in the gas phase a cyclic ketoxime having 5 to 12 carbon atoms in the ring in the presence of a catalyst selected from the group consisting of a mixture of boron nitride and boric acid and of boron nitride and boron trioxide, said rearranging being carried out at temperatures in the range of from 200 to 400° C., preferably at 270 to 370° C.

Surprisingly, it has been found that a mixture of boron nitride with boric acid or boron trioxide used as catalyst for the rearrangement of the cyclic ketoximes has a much longer service life than any of the conventional catalysts containing boric acid. Apart from this, the new catalyst is also distinguished by the fact that it enables the rearrangement reaction to be carried out at normal pressure so that it is possible to obtain high lactam yields which hitherto could only be obtained under reduced pressure.

The catalyst may readily be prepared by mixing boric acid with boron nitride and making the resulting mixture into a paste with a little water. The resulting mass is dried and calcined at a temperature of from 400 to 800° C. Subsequently, the calcined mass is subdivided to the required grain size. Optionally, the catalyst may be converted into any desired form, for example, by pelletising or extrusion, before it is calcined. The ratio of boric acid to boron nitride may vary within wide limits, although the boric acid content of the completed catalyst is with advantage from 10 to 70%.

The most favourable temperature for the rearrangement reaction is from 270 to 370° C. The process may be carried out either at normal pressure or at reduced pressure. The oxime may also be passed over the catalyst together with an inert carrier gas, such as for example nitrogen, hydrogen carbon dioxide, methane or steam. Steam has a particularly advantageous effect upon the rearrangement reaction and should always be present.

If the catalyst loses some of its activity after a period of use, it may be regenerated simply by burning off the carbonisation products. In general, this method of regeneration is best applied after 8 to 20 parts by weight of oxime have been reacted in the presence of 1 part by weight of catalyst.

The process according to the invention may be used for rearranging cyclic ketoximes with from 5 to 12 carbon atoms in the ring, for example, cyclopentanone oxime, cyclohexanone oxime, methyl-cyclohexanone oxime, cycloheptanone oxime and cyclododecanone oxime, into the corresponding lactams.

The following example is to further illustrate the invention without limiting it.

EXAMPLE

55 g. of boric acid and 44 g. of boron nitride were thoroughly mixed and the resulting mixture was made into a paste with a little water. The resulting mass was dried, calcined for 3 hours at 580° C. and then size-reduced. 10 g. of the resulting catalyst, with a grain size of from 0.5 to 2 mm., were used for the rearrangement of cyclohexanone oxime. The reaction was carried out under normal pressure at 320 to 350° C. in the presence of nitrogen as carrier gas. 25 litres of nitrogen and 15 to 16 g. of cyclohexanone oxime containing 4% by weight of water were passed hourly over the catalyst. The catalyst was accommodated in a 2.5 cm. wide reaction tube that was electrically heated. After it had been in service for 12 hours, the catalyst was removed, roasted for 30 minutes at 700 to 800° C. in an open crucible and then re-used for the rearrangement reaction. Thereafter, this method of regeneration was repeated every 6 hours for a total of 39 times. After each regeneration, the catalyst was weighed and any losses compensated by the addition of fresh catalyst. During the test, 3.6 g. of fresh catalyst were gradually added to the originally used quantity of 10 g. A total of 3814 g. of cyclohexanone oxime was passed over the catalyst, 94% being reacted. The caprolactam yield came to 95%, based on the cyclohexanone oxime reacted. Accordingly, 250 parts by weight of caprolactam were prepared using 1 part by weight of catalyst.

What we claim is:

1. A process for the production of lactams which comprises rearranging in the gas phase a cyclic ketoxime having 5 to 12 carbon atoms in the ring in the presence of a catalyst selected from the group consisting of a mixture of boron nitride and boric acid and of boron nitride and boron trioxide, said rearranging being carried out at temperatures in the range of from 200 to 400° C.

References Cited

UNITED STATES PATENTS 3,154,539   10/1964   Irnich et al. _____ 260—239.3

HENRY R. JILES, Primary Examiner

R. T. BOND, Assistant Examiner

U.S. Cl. X.R.

260—294.7; 252—432